United States Patent
Launchbury et al.

[11] Patent Number: 6,141,969
[45] Date of Patent: Nov. 7, 2000

[54] BEVERAGE VESSEL HOLDER

[75] Inventors: Brian Launchbury, Burton-on-Trent; Neil Beloe, Rugby, both of United Kingdom

[73] Assignee: Rover Group Limited, Warwick, United Kingdom

[21] Appl. No.: 09/257,847

[22] Filed: Feb. 25, 1999

[30] Foreign Application Priority Data

Mar. 10, 1998 [GB] United Kingdom .................. 9804896

[51] Int. Cl.$^7$ .................................................. F25B 21/02
[52] U.S. Cl. ............................... 62/3.2; 62/3.4; 165/80.1; 220/739; 220/903
[58] Field of Search ................................. 220/739, 903; 62/3.2, 3.6, 3.62, 457.2, 3.4; 165/80.1; 126/262, 266, 261

[56] References Cited

U.S. PATENT DOCUMENTS

| | | | |
|---|---|---|---|
| 2,991,628 | 7/1961 | Tuck | 62/3.62 |
| 3,302,428 | 2/1967 | Stoner et al. | 220/903 X |
| 3,823,567 | 7/1974 | Corini | 62/3.6 |
| 3,839,876 | 10/1974 | Privas | 62/6.62 |
| 4,052,258 | 10/1977 | Sundhar | 62/3.2 |
| 5,035,122 | 7/1991 | Oogjen | 62/457.2 |
| 5,111,664 | 5/1992 | Yang | 62/3.62 |
| 5,186,350 | 2/1993 | McBride | 220/739 |
| 5,413,166 | 5/1995 | Kerner et al. | 62/3.4 X |
| 5,572,872 | 11/1996 | Hlavcek | 62/3.6 |
| 5,862,669 | 1/1999 | Davis et al. | 62/3.64 |
| 5,934,079 | 8/1999 | Han et al. | 62/3.2 |

FOREIGN PATENT DOCUMENTS

| | | | |
|---|---|---|---|
| 0 426 092 A1 | 5/1991 | European Pat. Off. . | |
| 3639089 | 5/1988 | Germany | 62/3.6 |
| 88/04758 A1 | 6/1988 | WIPO . | |
| 97/26490 A1 | 7/1997 | WIPO . | |

Primary Examiner—Allan N. Shoap
Assistant Examiner—Joe Merek
Attorney, Agent, or Firm—Davis and Bujold

[57] ABSTRACT

A beverage vessel holder (1) is described in which a thermo-electric device (2) including a Peltier effect element (4) provides heating and/or chilling effect to a beverage vessel (10) in use. Extending from the thermo-electric device (2) is a wall assembly (3) comprising an inner wall (6) and an outer wall (7) in a spaced relation such that there is a convection passage (8) therebetween. The thermo-electric device (2) being associated with the wall assembly (3) in order to stimulate convection air movement in the convection passage (8) and so disperse condensate wicked through the inner wall (6) from the beverage vessel (10). Thus, the inner wall (6) is generally made from a foam material in order to allow condensate transmission whilst the outer wall (7) provides a thermal insulation barrier for the holder (1).

20 Claims, 1 Drawing Sheet

BEVERAGE VESSEL HOLDER

FIELD OF THE PRESENT INVENTION

In accordance with the present invention there is provided a beverage vessel holder and more particularly a holder for use within a motor vehicle.

BACKGROUND TO THE PRESENT INVENTION

As part of the discretionary equipment installed within a motor vehicle, it has become common to include a beverage vessel holder. This holder provides a convenient means to intermittently drink from a beverage vessel during a motor vehicle journey whilst remaining fully in control of that vehicle. Originally, such holders simply retained the vessel, whether it be a cup or a can or bottle, to ensure judder movement in the motor vehicle doesnot disturb and so spill the beverage contained within such a vessel. More recently, it has become desirable to chill or heat beverages or simply maintain such beverages within their beverage vessel at a desired temperature. However, within a motor vehicle there is limited electrical power capacity so thermo-electric devices based upon the Peltier effect or Seebeck effect have been used to achieve necessary chilling/heating effect. Examples of such thermo-electric device arrangements are illustrated in U.S. Pat. No. 5,042,258 and International Patent Publication No. WO 90/00708. Typically, switching between heating and chilling involves simple reversal of electrical current flow between respective sides of the semi-conductor wafers which define the thermo-electric device.

An unfortunate consequence of heating or chilling a beverage vessel is either the precipitation or evaporation of, generally, water condensate. Such water condensate can reduce thermal insulation and add to the size of thermal load i.e. the heat capacity of the whole for unit temperature, necessary to achieve the desired temperature variation. The water condensate generally congregates upon the beverage vessel surface and may cool and wet the beverage vessel such that, in addition to the low thermal efficiency, an unsightly appearance and slippy surface upon the vessel is created.

It is an object of the present invention to provide a beverage vessel holder which allows temperature control but substantially avoids the above-mentioned problems.

SUMMARY OF THE PRESENT INVENTION

In accordance with the present invention there is provided a holder for heating or cooling a beverage vessel, the holder comprising a thermo-electric device from which extends a wall assembly including an inner wall and an outer wall, said inner wall being configured to retain in use a beverage vessel and allow condensate through transmission thereacross from said beverage vessel whilst, said outer wall is spaced from said inner wall to define a convection passage therebetween, said convection passage being associated with said thermo-electric device to stimulate convection air movement in said convection passage as said thermo-electric device alters or maintains, in use, the temperature of said beverage vessel.

The inner wall is generally a foam and that foam has a small open cell nature to facilitate wicking condensate transmission through the inner wall. Typically, the inner wall will be configured to retain said beverage vessel under slight compressive engagement.

The outer wall will normally provide thermal insulation for the holder.

Typically, the space in between the inner wall and the outer wall is in the order of 3–4 mm to avoid liquid condensate bridging between said inner wall and said outer wall. The spacing between the inner wall and the outer wall may diverge in order to enhance convection air movement in said convection passage. The thermo-electric device will generally include a heat sink for coupling to said convection passage in order to stimulate convection air movement in accordance with the present invention. The thermo-electric device may include a fan, or be coupled to such an air movement stimulating device, to supplement convection air movement in said convection passage.

Typically, the convection passage will be open ended at both ends to facilitate condensate drainage and/or convection air movement.

Preferably, the thermo-electric device comprises a mounting from which the wall assembly is detachable in order to allow drinking from the beverage vessel retained therein.

The convection passage may include spacer elements or castellation elements in order to retain the spacing between the inner wall and the outer wall to retain the convection passage.

Normally the thermo-electric device will operate upon the known Peltier effect or the Seebeck effect to heat or chill as required.

BRIEF INTRODUCTION TO THE DRAWINGS

An embodiment of the present invention will now be described by way of example only with reference to the accompanying drawings, in which.

DESCRIPTION OF THE PRESENT INVENTION

Figure 1:
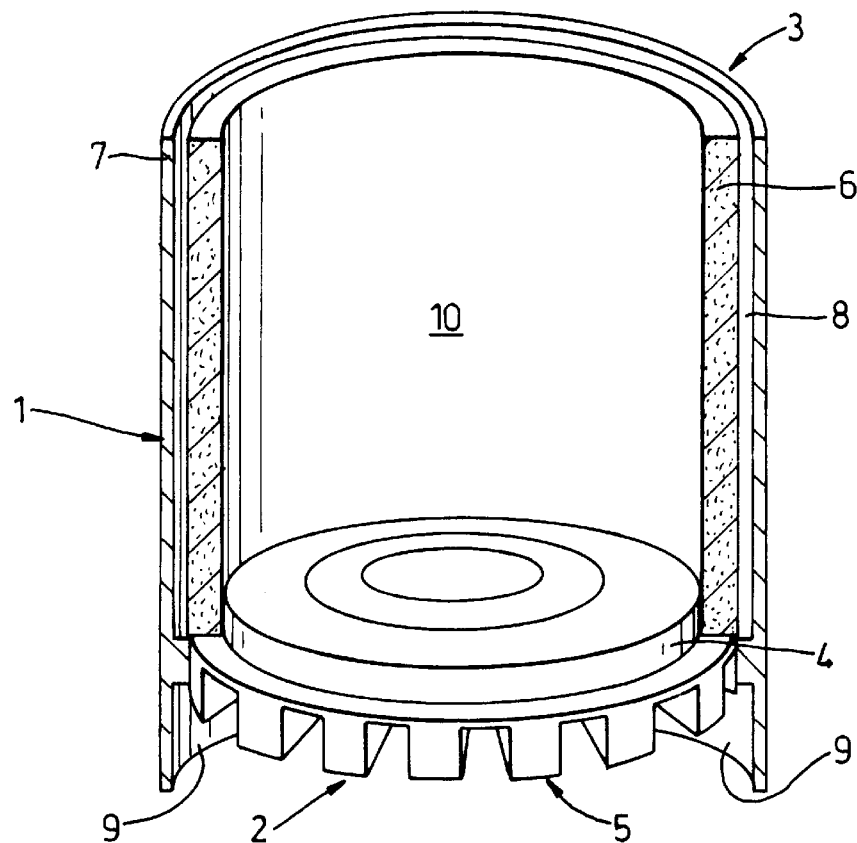
FIG. 1 is a schematic perspective view of a beverage vessel holder.

In FIG. 1 a schematic perspective of a beverage vessel holder 1 is depicted. This holder 1 comprises a thermo-electric device 2 from which a wall assembly 3 extends. The thermo-electric device 2 comprises typically a Peltier effect element 4 in association with a heat sink 5. The wall assembly 3 comprises an inner wall 6 spaced from an outer wall 7. The inner wall 6 is arranged to retain the beverage vessel, such as a can, cup or bottle, in contact with the Peltier effect element 4. Typically, the inner wall 6 is arranged to retain the beverage vessel under slight compression whilst the outer wall provides thermal insulation for the holder 1.

The wall assembly 3 extends from the thermo-electric device 2 as depicted in FIG. 1 such that there is a skirt about the thermo-electric device 2. Thus, a convection passage, defined by the spacing between the inner wall 6 and the outer wall 7, is coupled to the thermo-electric device 2 such that any heat cycling within that device 2 creates convection air flow in the convection passage 8. It will be appreciated, when the thermo-electric device 2, and in particular the heat sink 5, is hot, air between that device 2 and the outer wall 7 in the area numbered 9 is heated and it will be understood that hot air generally rises upwards through the convection passage 8 to provide a convection air flow. Conversely, when the thermo-electric device 2 and in particular the heat sink 5 is cool, the same air located between the device 2 and the outer wall 7 is cooled, such cooled air is heavier and thus tends to fall stimulating a downward flow of air in the passage 8 as a convection air flow.

The inner wall 6 will normally be made from a foam material with a small, but open cell, nature. Thus, the inner wall 6 will generally draw condensation from a beverage vessel 10 retained within this inner wall 6 by a wicking action. However, the inner wall 6 must have sufficient mechanical strength to maintain its integrity during insertion of a beverage vessel 10 but, as indicated above, will normally include a degree of elastic deformation in order to compressively engage such an inserted beverage vessel 10. With the wicking nature of the inner wall 6, it will be appreciated that condensation from the beverage vessel 10, along with other surfaces, will congregate in the convection passageway 8. In accordance with the present invention, this condensate is dispersed by the stimulated convection air movement within that passage 8 as a result of thermal cycling of the thermo-electric device 2. In such circumstances, the convection passage 8 acts as a chimney through which air movement is stimulated such that condensate "pick up" is enhanced in order to remove that condensate from the environment of the beverage vessel holder 1 in comparison with non-stimulated and stagnant air.

The beverage vessel 10, in accordance with the present invention, will therefore be drier and thus more acceptable to a user as a result of the condensate dispersal through the inner wall 6 and subsequently the convection passage 8. In addition, any condensate can add appreciably to the thermal burden placed upon the thermo-electro device 2 required to reduce or increase or maintain temperature. Thus, improved dispersal of condensate should enhance thermo-electro device 2 performance with regard to altering or maintaining the vessel 10, along with any beverage therein, at temperature.

Condensate is essentially water which has a relatively high specific heat capacity thus, every cubic centimetre of such condensate associated with the beverage vessel 10, or other surfaces of the beverage vessel holder, will appreciably increase the thermal mass of material that the thermo-electric device 2 must maintain or alter the temperature of.

Figure 2:
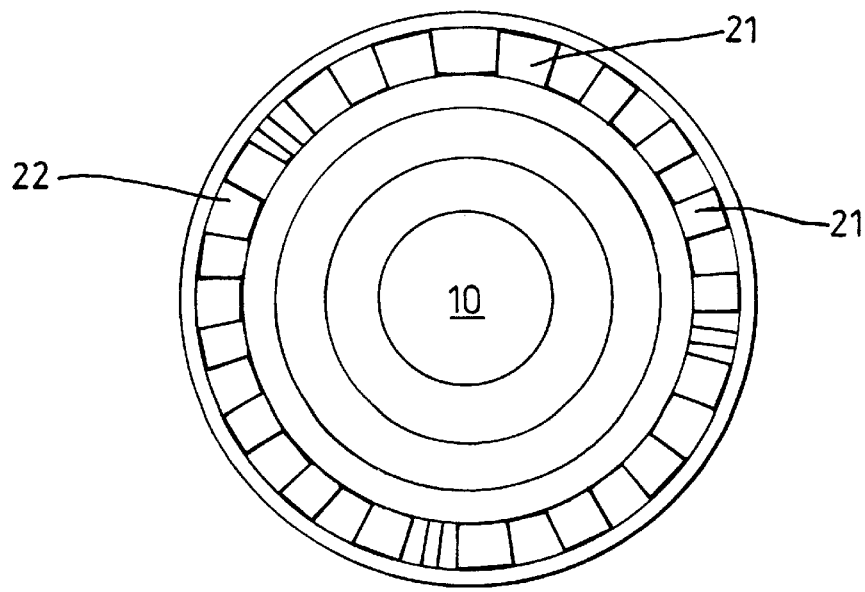
FIG. 2 is a schematic plan view of a beverage vessel container.

In order to maintain the convection passage 8, it is typical to provide spacer elements between the inner wall 6 and the outer wall 7. These spacer elements can take any appropriate form and could thus comprise continuous strips which run the length of the holder between the inner wall 6 and the outer wall 7. Alternatively, and as depicted in FIG. 2, the spacer elements could comprise castellations 21 integral with or supplemental to the inner wall 6 and/or the outer wall 7. Between these castellations 21, the convection passage 8 is redefined to individual channels 22. Such channels 22 inherently concentrate any air movement and so turbulence of such convection flows with the result that greater condensate pick up may be achieved. The channels 22 may be further configured to facilitate air convection movement by twisting or variable cross-sectional dimensions etc.

As the inner wall 6 is normally made from a foam, it will be appreciated that, the generally rough nature of such foam surfaces will stimulate localised air turbulence. In addition, a fan may be provided, either coupled directly or through ducting to the convection passage 8, to stimulate and supplement air flow in the convection passage 8.

In order to further enhance condensate control, it will be appreciated that either the inner or outer surface of the inner wall 6 could be coated with a microporous film to control condensate return. Thus, condensate vapour may pass through the porous film and then condense to droplets of a size that cannot return.

Peltier thermo-electric elements are well known for heating and chilling of beverages. Suitable suppliers for such elements are well-known to those skilled in the art. Such Peltier effect elements utilise the metal or semiconductor effects due to electrical current flow and a description of the Peltier effect is given in the text book "Solid State Physical Electronics" (Aldert van der Ziel), Third Edition, Prentice-Hall Inc, page 499–500. A heat sink 5 is required in order to either disperse heat energy taken from the beverage vessel 10 in contact with the element 4 or to act as a heat balance when the element 4 is heating a beverage vessel 10 in contact with it. Typically, the heat sink 5 includes fins to maximise heat exchange with its surroundings and will be made from a high thermal conductivity material such as aluminium or copper. The heat sink 5 may be anodised in order to further increase heat dissipation but more importantly resist oxidation in this relatively damp environment. Furthermore, in order to ensure good thermal coupling between the Peltier element 4 and the vessel 10, it will be appreciated that a contact pad will be provided upon the element 4. This pad will be generally be a bag or cushion formed from an envelope of material, i.e. rubber, in which a thermally conductive fluid is located, i.e. water/glycol mix or silicon fluid. Alternatively, the pad could be a solid thermally conductive but shape compliant element to achieve close thermal contact over a greater thermal exchange contact area with the vessel 10.

It will be appreciated that it is the skirt area 9, between the heat sink 5 and the outer wall 6, which is subjected most significantly to the heat cycling effects of the thermo-electric device 2 and in particular the heat sink 5. Such heating or cooling of the air volume enveloped within this skirt area 9 about the circumference of the holder 1 creates the necessary air convection movements described above. In such circumstances, it can be appreciated that this skirt area 9 may be configured to enhance such convection air movements through recesses and protrusions, etc.

The Peltier effect element 4 will be simply connected to the existing electrical harness of the motor vehicle with appropriate switching to achieve heating or cooling as required. It will be appreciated that the difference between heating and cooling is generally simply a result of different electrical current flow directions.

The convection passage 8 between the inner wall 6 and the outer wall 7 is normally open at both ends in order to allow drainage of any condensate remaining therein and to facilitate convection air flows. It will be appreciated, when the thermo-electric device 2 is made inoperative that the convection effect on air movement within the convection passage 8 is gradually diminished as the heat sink 5 approaches ambient temperature. Thus, it will be advantageous to allow the heat sink 5 to have sufficient heat capacity to stimulate convection air flow in order to substantially dry the inner wall 6 after the device 2 is switched off.

Although the above description illustrates how a beverage vessel, and inherently the beverage therein, is heated or chilled, it is implicit that such beverage must eventually be consumed. Thus, in accordance with the present invention, the beverage vessel 10 can be removed from the engagement within the inner wall 6 by a simple lifting action or, alternatively, the wall assembly 3 could be mounted detachably upon the thermoelectric device 2 such that the wall assembly 3 along with the beverage vessel 10 is lifted and replaced upon the mounting of the thermoelectric device 2 as required. Furthermore, the overlap i.e. the skirt 9, between the wall assembly 3 and the mounting of the thermo-electric device 2 will add to stability. However, the top edge of the wall assembly 3 would require appropriate configuration, such as over-lipping, in order to avoid beverage entry to the convection passage 8 as the beverage is consumed.

It will be appreciated by those skilled in the art that condensate will generally present a problem upon chilling within the beverage vessel holder 1 whilst upon heating the main function of the inner wall 6 will be to provide thermal insulation. However, the convection air movement generated in accordance with the present invention will ensure that this inner wall 6 is drier than previous holders and so provides generally better thermal insulation.

In order to ensure that no unsightly condensate pools are created by the holder, it will be appreciated that the convection passage 8 could be coupled to a gutter in the heat sink 5 which is subsequently connected to a sump where the consolidated condensate may be evaporated by the Peltier element 4 or by other means.

The heat sink 5 may be anodised to reduce oxidation thereof.

The vessel holder 1 may be coated with a thermally sensitive agent to show the temperature of the drink. Thus, the palatability of the beverage may be judged in terms of temperature/age if left for a time or for other reasons.

It will be appreciated that the term beverage in accordance with the present invention includes hot and cold drinks along with soup and other edible materials. The vessel holder could also be used for transportation of temperature sensitive materials such as scientific samples.

What we claim is:

1. A beverage vessel holder for one of heating and cooling a beverage vessel when contained within the holder, the holder comprising a thermo-electric device from which extends a wall assembly including an outer wall and an inner wall, the inner wall being configured to retain, during use, a desired beverage vessel and allowing condensate transmission from the beverage vessel via a wicking effect through the inner wall while the outer wall being spaced from the inner wall to provide a convection passage therebetween, the convection passage being associated with the thermo-electric device to stimulate convection air movement through the convection passage, as the thermo-electric device maintains or alters a temperature of the beverage vessel during use of the holder.

2. The holder as claimed in claim 1, wherein the inner wall is formed from an open cell foam material in order to provide the condensate transmission via said wicking effect.

3. The holder as claimed in claim 1, wherein the inner wall is substantially parallel to the outer wall so that the convection passage defined therebetween has a substantially constant cross-section.

4. The holder as claimed in claim 1, wherein the outer wall is made from a thermally insulating material.

5. The holder as claimed in claim 1, wherein the inner wall is spaced from the outer wall by a distance on the order of 3–4 mm.

6. The holder as claimed in claim 1, wherein the inner wall is sized to receive and retain the beverage vessel under slight compressive engagement.

7. The holder as claimed in claim 1, wherein the therm-electric device includes a heat sink, spaced from the beverage vessel when retained in the holder, associated with the convection passage.

8. The holder as claimed in claim 1, wherein the therm-electric device provides a mounting upon which the wall assembly is detachable.

9. The holder as claimed in claim 1, wherein the inner wall and the outer wall are held in a spaced relationship from one another by castellation spacer elements.

10. The holder as claimed in claim 1, wherein the thermo-electric device operates upon the Peltier effect.

11. A beverage vessel holder for one of heating and cooling a beverage vessel when contained within the holder, the holder comprising a thermo-electric device having a wall assembly, including an outer wall and an inner wall, extending therefrom, the inner wall being configured to captively receive and retain, during use, a desired beverage vessel and allowing condensate transmission, from the beverage vessel, through the inner wall via a wicking effect through the inner wall while the outer wall being spaced from the inner wall to define a convection passage therebetween, and the convection passage being associated with the thermo-electric device to stimulate a flow of convection air movement through the convection passage, as the thermo-electric device maintains or alters a temperature of the beverage vessel during use of the holder to remove any transmitted condensate from the convection passage.

12. The holder as claimed in claim 11, wherein the inner wall is formed from an open cell foam material in order to provide the condensate transmission via said wicking effect and the outer wall is made from a thermally insulating material.

13. The holder as claimed in claim 11, wherein the inner wall is substantially parallel to the outer wall so that the convection passage defined therebetween has a substantially constant cross-section.

14. The holder as claimed in claim 13, wherein the inner wall is spaced from the outer wall by a distance on the order of 3–4 mm.

15. The holder as claimed in claim 11, wherein the inner wall is sized to receive and retain the beverage vessel under slight compressive engagement;

said therm-electric device includes a heat sink, spaced from the beverage vessel when retained in the holder, associated with the convection passage; and said therm-electric device provides a mounting upon which the wall assembly is detachable.

16. The holder as claimed in claim 11, wherein the inner wall and the outer wall are held in a spaced relationship from one another by castellation spacer elements.

17. The holder as claimed in claim 11, wherein the thermo-electric device operates upon the Peltier effect.

18. A beverage vessel holder for one of heating and cooling a beverage vessel when contained within the holder, the holder comprising a thermo-electric device having a wall assembly, including an outer wall and an inner wall, extending therefrom, the inner wall being an open cell foam material configured to retain, during use, a desired beverage vessel while allowing condensate transmission, from the beverage vessel, through the inner wall via a wicking effect through the inner wall the outer wall being made from a thermally insulating material and being spaced from the inner wall to define a convection passage therebetween, the inner wall being substantially parallel to the outer wall so that the convection passage defined therebetween has a substantially constant cross-section, and the convection passage being associated with the thermo-electric device to stimulate a flow of convection air movement through the convection passage, as the thermo-electric device maintains or alters a temperature of the beverage vessel during use of the holder to remove any transmitted condensate from the convection passage.

19. The holder as claimed in claim 18, wherein the inner wall is spaced from the outer wall by a distance on the order of 3–4 mm; and said inner wall is sized to receive and retain the beverage vessel under slight compressive engagement.

20. The holder as claimed in claim 18, wherein the therm-electric device includes a heat sink, spaced from the beverage vessel when retained in the holder, associated with the convection passage;

said therm-electric device provides a mounting upon which the wall assembly is detachable;

said inner wall and the outer wall are held in a spaced relationship from one another by castellation spacer elements; and said thermo-electric device operates upon the Peltier effect.

* * * * *